United States Patent Office 3,358,027
Patented Dec. 12, 1967

3,358,027
DIBENZAZULENES
Cornelis van der Stelt, Haarlem, North Holland, Netherlands, assignor to N.V. Koninklijke Pharmaceutische Fabrieken v/h Brocades Stheeman en Pharmacia, Amsterdam, Netherlands, a corporation of Dutch law
No Drawing. Filed Aug. 13, 1964, Ser. No. 389,471
Claims priority, application Great Britain, Sept. 16, 1963, 36,436/63
8 Claims. (Cl. 260—576)

ABSTRACT OF THE DISCLOSURE

Dibenzazulenes having the formula

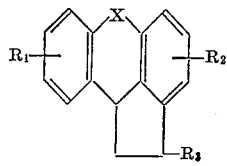

and non-toxic acid-addition salts thereof, wherein X is —$CH_2$—$CH_2$— or —CH=CH—, $R_1$ and $R_2$ are hydrogen, halogen and lower alkyl, and $R_3$ is a basic nitrogen-containing radical of less than twelve carbon atoms. The compounds of this invention have been found to possess analgesic activity.

---

This invention relates to new therapeutically useful dibenzazulenes and their acid addition salts, to processes for their preparation and to pharmaceutical preparations containing them.

According to the present invention there are provided the new dibenzazulenes of the general Formula I:

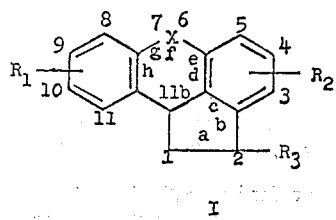

wherein X represents a —$CH_2$—$CH_2$— or —CH=CH— group, $R_1$ and $R_2$ each represents hydrogen, halogen or a lower alkyl group, and $R_3$ represents a basic nitrogen-containing radical of less than twelve carbon atoms. Among the suitable radicals represented by the symbol $R_3$ are amino; (lower alkyl)amino; di(lower alkyl)amino; (hydroxy-lower alkyl)amino; di(hydroxy-lower alkyl)amino; phenyl(lower alkyl)amino; N-(lower alkyl)-N-phenyl(lower alkyl)amino; and saturated 5 to 7 membered monocyclic N-heterocyclic radicals of less than twelve carbon atoms, as exemplified by piperidino; (lower alkyl)-piperidino; (lower alkoxy)-piperidino; homopiperidino; pyrrolidino; (lower alkyl)-pyrrolidino; di(lower alkyl)-pyrrolidino; (lower alkoxy)-pyrrolidino; morpholino; di(lower alkyl)-morpholino; (lower alkoxy)-morpholino; thiamorpholino; (lower alkyl)-thiamorpholino; di(lower alkyl)thiamorpholino; (lower alkoxy)-thiamorpholino; piperazino; (lower alkyl)-piperazino (e.g. $N_4$-methylpiperazino); di(lower alkyl)-piperazino; (lower alkoxy)-piperazino; $N_4$-(hydroxy-lower alkyl)-piperazino; $N_4$-(lower alkanolyloxy-lower alkyl)-piperazino; and homopiperazino. The terms "lower alkyl" and "lower alkoxy" as employed herein include both straight and branched chain radicals of less than eight carbon atoms. The particularly preferred compounds are those wherein X is —$CH_2$—$CH_2$— group, $R_1$ and $R_2$ each represent a hydrogen atom and $R_3$ is a (lower alkyl)amino or di(lower alkyl)amino group.

As to the salts, those coming within the purview of this invention include the acid addition salts, particularly the non-toxic acid addition salts. Acids useful for preparing these acid addition salts include inter alia, inorganic acids, such as the hydrohalic acids (e.g. hydrochloric and hydrobromic acid), sulphuric acid, nitric acid, boric acid and phosphoric acid, and organic acids, such as oxalic, fumaric, tartaric, citric, acetic, succinic, pamoic and maleic acid.

The dibenzazulenes of this invention and acid addition salts thereof are therapeutically active compounds which possess analgesic activity. The compounds of this invention can be administered perorally, the dosage for such treatment being adjusted for the activity of the particular compound employed.

According to a feature of the invention, the compounds of Formula I are prepared by the process which comprises converting a dibenzocycloheptyl acetic acid of the general Formula II:

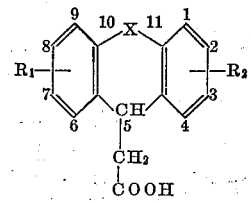

(wherein at least one of the 4- and 6-positions is unsubstituted) into a ketone of the general Formula III:

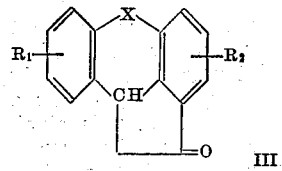

and reducing the ketone in the presence of a compound of the formula $HR_3$, X, $R_1$ and $R_3$ being as hereinbefore defined. Preferably the acid of the general Formula II is first converted into an acid halide by reaction with such agents as thionyl chloride or thionyl bromide. It is preferred to carry out the halogenation reaction in the presence of an inert organic solvent such as benzene or toluene. The acid halide is then converted into the ketone of the general Formula III by using the conditions of the Friedel-Crafts reaction. As medium for the reaction inert organic solvents such as carbon disulphide and nitrobenzene can be used while aluminium chloride or stannic chloride can be used as complex-forming agents or catalysts. The reduction of the ketone of Formula III is preferably carried out in the presence of an inert organic solvent, e.g. an alcohol such as n-butanol. As reducing agent hydrogen in the presence of a Raney nickel catalyst is preferred.

Among the suitable dibenzocycloheptyl acetic acids of the Formula II, which can be used as initial reagents in the above reactions, there may be mentioned:

(10,11-dihydro-5H-dibenzo[a,d]-cyclohepten-5-yl)acetic acid;

(1,2,3 and 4-chloro-10,11-dihydro-5H-dibenzo[a,d]cyclo-heptene-5-yl)acetic acid;

(1,2,3 and 4-bromo-10,11-dihydro-5H-dibenzo[a,d]cyclo-hepten-5-yl)acetic acid;

(1,2,3 and 4-methyl-10,11-dihydro-5H-dibenzo[a,d]cyclo-hepten-5-yl)acetic acid;

(1,2,3 and 4-ethyl-10,11-dihydro-5H-dibenzo[a,d]cyclo-hepten-5-yl)acetic acid;

(1,2,3 and 4-isopropyl-10,11-dihydro-5H-dibenzo[a,d]
cyclohepten-5-yl)acetic acid;
(1,2,3 and 4-tert.-butyl-10,11-dihydro-5H-dibenzo[a,d]
cyclohepten-5-yl)acetic acid;
(1,3- 1,7- and 3,7-dimethyl-10,11-dihydro-5H-dibenzo
[a,d]cyclohepten-5-yl)acetic acid;
(1-chloro-3-methyl-10,11-dihydro-5H-dibenzo[a,d]cyclo-
hepten-5-yl)acetic acid;
(5H-dibenzo[a,d]cyclohepten-5-yl)acetic acid;
(1,2,3 and 4-chloro-5H-dibenzo[a,d]cyclohepten-5-yl)
acetic acid;
(1,2,3 and 4-bromo-5H-dibenzo[a,d]cyclohepten-5-yl)
acetic acid;
(1,2,3 and 4-methyl-5H-dibenzo[a,d]cyclohepten-5-yl)
acetic acid;
(1,2,3 and 4-ethyl-5H-dibenzo[a,d]cyclohepten-5-yl)
acetic acid;
(1,2,3 and 4-isopropyl-5H-dibenzo[a,d]cyclohepten-5-yl)
acetic acid;
(1,2,3 and 4-tert.-butyl-5H-dibenzo[a,d]cyclohepten-5-yl)
acetic acid;
(1,3- 1,7- and 3,7-dimethyl-5H-dibenzo[a,d]cyclohepten-
5-yl)acetic acid, and
(1-chloro-3-methyl-5H-dibenzo[a,d]cyclohepten-5-yl)
acetic acid.

If a monosubstituted or asymmetrically disubstituted di-
benzocycloheptenyl-acetic acid is used as reactant, the
position of the substituents on the resulting dibenzazule-
none and therefore also on the end product of the For-
mula I will depend on the results of the ring closure reac-
tion, two dibenzazulenones being feasible leading to two
different dibenzazulenes, but when the substituents, or
one of the substituents is in the 4- or 6-position of the
dibenzocycloheptyl-acetic acid only one dibenzazulenone
intermediate of Formula III is obtainable. Thus, where
a 3-substituted-dibenzocycloheptenyl-acetic acid is used
as starting material, a mixture of 3- and 10-substituted-
dibenzazulenones is obtained; from a 1,3-disubstituted-
dibenzocycloheptenyl-acetic acid a mixture of 8, 10 and
5,3-disubstituted dibenzazulenones results, but from a 4-
substituted - dibenzocyclohepty1 - acetic acid an 11 - sub-
stituted dibenzazulenone only is obtained. If two di-
benzazulenones are formed, these products are then sep-
arated by fractional crystallization and the separated prod-
ucts subjected to the final reduction and amination step
of the process of the invention.

The starting materials of Formula II can be prepared in
several ways. According to one method, a ketone of the
Formula IV:

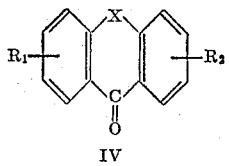

IV (wherein X, $R_1$ and $R_2$ are as hereinbefore defined) is
reacted with acetylene in a medium of liquid ammonia
and in the presence of a condensing agent, such as sod-
amide, to yield an acetylenic compound of the Formula V:

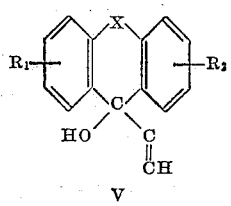

V which is caused to isomerize by treatment with an acid
under the conditions of the Meyer-Schuster reaction, to
give an aldehyde of the Formula VI:

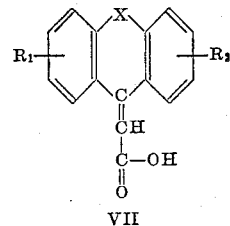

VI which thereafter is oxidized to give the corresponding
unsaturated acid of the Formula VII:

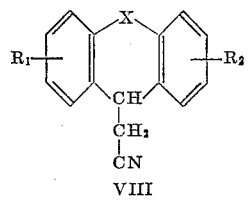

VII

A suitable agent for effecting the oxidation is silver oxide.
The oxidation is preferably effected in an alcoholic solu-
tion of an alkali hydroxide. The unsaturated acid of For-
mula VII is then reduced to give an acid of general For-
mula II by reaction with hydrogen in the presence of a
Raney nickel catalyst.

According to another method for preparing the starting
materials of Formula II, the ketone of the Formula IV
is first reduced in manner known per se to yield the cor-
responding alcohol which thereupon is reacted with cyan-
acetic acid using the method described by Goldberg and
Wragg (J. Chem. Soc. 1957, 4823) to yield a compound
of the Formula VIII:

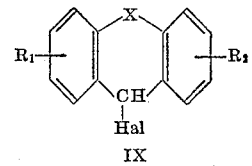

VIII wherein X, $R_1$ and $R_2$ are as hereinbefore defined. The
nitrile is then subjected to saponification in an alkaline
medium.

According to a further method, the ketone of Formula
IV is first reduced to form the corresponding alcohol which
is then converted into a halogen substituted compound
of the Formula IX:

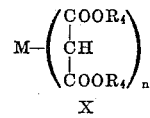

IX wherein X, $R_1$ and $R_2$ are as hereinbefore defined and Hal
represents a halogen (preferably a chlorine) atom. The
compound of the Formula IX is then interacted with a
compound of the Formula X:

$$M-\begin{pmatrix} COOR_4 \\ | \\ CH \\ | \\ COOR_4 \end{pmatrix}_n$$

X wherein $n$ represents 1 or 2, $R_4$ represents a lower alkyl
(preferably ethyl) group and M is an alkali metal atom
if $n=1$ or an alkaline earth metal atom, preferably a mag-
nesium atom, if $n=2$. The reaction is preferably conducted
in the presence of an inert organic solvent such a diethyl ether or tetrahydrofuran. After hydrolysis of the metal complex and saponification of the resultant ester, a malonic acid of the Formula XI:

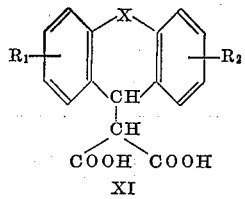

is obtained, which is decarboxylated in manner known per se yielding a dibenzocycloheptyl acetic acid of the Formula II.

According to a still further method, a compound of the Formula IX is reacted with a metal derivative of ethyl acetoacetate yielding a compound of the Formula XII:

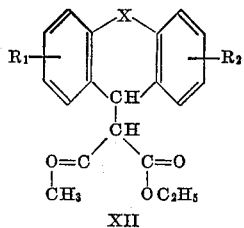

wherein X, $R_1$ and $R_2$ are as hereinbefore defined. As a metal derivative of ethyl acetoacetate, the copper derivative is preferably used. The reaction is carried out in an inert organic solvent such as benzene. The compounds of Formula XII are converted into the acids of Formula II upon treatment with a solution of an alkali metal hydroxide in an alcohol such as ethanol.

According to another method, a ketone of the Formula IV is first reduced to the corresponding alcohol which thereupon is reacted with malonic acid, preferably in a medium of acetic acid. The dibenzocyclohepten-5-yl-malonic acid formed is converted into the corresponding dibenzocyclohepten-5-yl-acetic acid either by heating as such or in a pyridine solution.

The following procedures, in which the temperatures mentioned are in degrees centigrade and the percentage yields mentioned are related to the theoretical yield, illustrate the preparation of starting materials conforming to Formula II.

PROCEDURE I

A one litre flask is fitted with a dropping-funnel, a gas-inlet tube filled with solid potassium hydroxide, and a condenser to the upper end of which a tube filled with solid potassium hydroxide is attached. Flask and condenser are cooled with solid carbon dioxide in acetone. From a gas cylinder a quantity of about 200–250 ml. of ammonia is condensed into the flask through the tube filled with potassium hydroxide. Another flask, fitted with an inlet tube nearly reaching to the bottom, an outlet tube and an ascending tube is filled with water. The inlet tube is connected with two washing-bottles placed in series and filled with concentrated sulphuric acid and, moreover, with a tower filled with glass-wool. The latter system is connected with a supply of nitrogen gas. The air is completely replaced by nitrogen by bubbling same through the system. The nitrogen supply is switched off and a stream of acetylene gas passed through the flask containing water (to remove acetone vapor stemming from the acetone soaked diatomaceous earth, wherein the acetylene is dissolved in the cylinder). The outlet of the tower is then connected with the inlet tube of the flask containing the liquid ammonia. 0.2 gram atom of sodium in the form of small pieces is added to the ammonia, whilst acetylene is being passed through. If the sodium is added too rapidly the solution turns blue. When the total quantity of sodium has been added (time needed about 30 minutes) the stream of acetylene is throttled down, and thereafter 0.2 mol of 10,11-dihydro-5H-dibenzo[a,d]cyclohepten-5-one dissolved in about 350 ml. of ether is added during the course of about 45 minutes. Then the acetylene supply is cut off, and the reaction mixture is left to react at a temperature of about −60 to −50°. The flask is kept standing overnight without stirring or cooling so as to let the ammonia evaporate. The reaction mixture is then diluted with water, the ether layer is separated, extracted with water and dried with anhydrous sodium sulphate. The ethereal solution is concentrated after filtration, and petroleum ether (boiling range 28–40°) is added to the residue. The precipitated solid is collected and crystallized from petroleum ether (boiling range 40–60°). 5-ethynyl-10,11-dihydro-5H-dibenzo[a,d]cyclohepten-5-ol, melting at 72.5–73°, is obtained in 82% yield.

To a refluxing mixture of 50 ml. of ethanol (96%), 15 ml. of water and 5 g. of concentrated sulphuric acid, there is added over a period of 30 minutes 10 g. of 5-ethynyl-10,11-dihydro-5H-dibenzo[a,d]cyclohepten-5-ol dissolved in 25 ml. of ethanol (96%). At the end of the addition, the reaction mixture is boiled under reflux for about 15 minutes and then poured onto ice after chilling. The resulting solid is filtered off and crystallized from petroleum ether (boiling range 40–60°). 10,11-dihydro-5H-dibenzo[a,d]cyclohept-5-ylidene-acetaldehyde, melting point 70.5–72°, is obtained in 90% yield.

To a mixture of 88 g. of 10,11-dihydro-5H-dibenzo[a,d]cyclohept-5-ylidene-acetaldehyde in 900 ml. of ethanol, and 110.5 g. of silver nitrate in 110 ml. of distilled water a solution of 90 g. of potassium hydroxide in 220 ml. of water and 870 ml. of ethanol is added dropwise with stirring at a temperature below 30°. Stirring is continued until the temperature starts to drop. The precipitate is filtered off and washed with ethanol and with boiling water. The filtrate is diluted with water and acidified with nitric acid. A precipitate consisting of crude 10,11-dihydro-5H-dibenzo[a,d]cyclohept-5-ylidene-acetic acid is collected. The compound is purified by crystallization from ethanol. Melting point 168–170°. Yield 60%.

50 grams of 10,11-dihydro-5H-dibenzo[a,d]cyclohept-5-ylidene-acetic acid are dissolved in ethanol. 8 grams of sodium hydroxide in ethanol are added. Reduction is carried out at a hydrogen pressure of three atmospheres using Raney nickel as catalyst. After the theoretical quantity of hydrogen has been taken up, the catalyst is filtered off and the ethanol is removed by distillation. The residue is dissolved in water and the solution acidified with hydrochloric acid. 10,11-dihydro-5H-dibenzo[a,d]cyclohepten-5-yl-acetic acid is filtered off and purified by crystallization from ethyl acetate. Melting point 159–161°. Yield 80%.

*Analysis.*—Calcd. for $C_{17}H_{16}O_2$: C, 80.92%; H, 6.39%. Found: C, 80.2%; H, 6.2%.

Similarly, by substituting an equivalent of the following substituted 10,11-dihydro-5H-dibenzo[a,d]cyclohepten-5-ones for the 10,11-dihydro-5H-dibenzo[a,d]cyclohepten-5-one in Procedure I, the indicated substituted 10,11-dihydro-5H-dibenzo[a,d]cyclohepten-5-yl acetic acids are prepared:

| Substituted 10,11-dihydro-5H-dibenzo[a,d]cyclohepten-5-one | Substituted 10,11-dihydro-5H-dibenzo[a,d]cyclohepten-5-yl acetic acid |
|---|---|
| 1-chloro | 1-chloro |
| 2-bromo | 2-bromo |
| 3-methyl | 3-methyl |
| 4-methyl | 4-methyl |
| 3-isopropyl | 3-isopropyl |
| 1-ethyl | 1-ethyl |
| 1,3-dimethyl | 1,3-dimethyl |
| 3,7-dimethyl | 3,7-dimethyl |

PROCEDURE II

A mixture of 73.5 g. of 10,11-dihydro-5H-dibenzo[a,d]cyclohepten-5-ol, 42.5 g. of cyanoacetic acid and 17 g. of anhydrous zinc chloride in 90 ml. of glacial acetic acid is boiled under reflux for eight hours with stirring. After cooling, the mixture is poured onto water and extracted with diethyl ether. The ethereal solution is quickly washed with a dilute sodium hydroxide solution, and dried with sodium sulphate. After filtration the solvent is evaporated. The residue is boiled under reflux with a mixture of 35 g. of potassium hydroxide, 17 ml. of water and 70 ml. ethanol for a period of 18 hours. The ethanol is distilled off. After cooling, water and diethyl ether are added to the residue. The layers are separated, the aqueous layer is acidified and extracted with diethyl ether. The ethereal solution is dried with sodium sulphate, filtered and concentrated. Residual 10,11 - dihydro-5H-dibenzo[a,d]cyclohepten-5-yl-acetic acid is crystallized from ethyl acetate. Yield 40%. Melting point 154–157°.

PROCEDURE III 52.25 g. of 10,11-dihydro-5H-dibenzo[a,d]cyclohepten-5-ol are dissolved in 150 ml. of anhydrous xylene, 24 g. of thionyl chloride are added drop-wise to the solution over a period of about 20 minutes, the solution being stirred and cooled so as to maintain a temperature of about 20° C. After the addition of the thionyl chloride, stirring is continued for another 1½ hours at room temperature. Anhydrous calcium chloride is then added to bind the water formed and the solution is filtered. After removal of the solvent by distillation, a residue consisting of crystalline 10,11-dihydro-5H-dibenzo[a,d]cyclohepten-5-yl chloride is obtained. The product is crystallized from petroleum ether (boiling range 80–100°), while adding decolorising charcoal; the chloride with a melting point of 101–103° is obtained in a yield of 92%.

A mixture of 6 g. of magnesium, 40 g. of freshly distilled diethyl malonate and 50 ml. of anhydrous ethanol is boiled under reflux. A few drops of carbon tetrachloride are added and the mixture is kept refluxing till the reaction starts. No further heating is applied and the mixture is stirred until no magnesium is left. Ethanol is distilled off under reduced pressure, 25 ml. of dioxane is added and distilled off again. This procedure is repeated so as to ensure that ethanol is removed as completely as possible. To the residue 100 ml. of anhydrous tetrahydrofuran is added followed by 57.1 g. of 10,11-dihydro-5H-dibenzo[a,d]cyclohepten-5-yl chloride in 200 ml. of tetrahydrofuran. The mixture is boiled under reflux for 4 hours and the tetrahydrofuran is removed by distillation. The residue is decomposed with water and dilute hydrochloric acid and extracted with diethyl ether. The ethereal solutions are dried with sodium sulphate. After filtration the diethyl ether is distilled off and the residue, crude diethyl 10,11-dihydro-5H-dibenzo[a,d]cyclohepten-5-yl-malonate, refluxed with a solution of 50 g. of potassium hydroxide in 25 ml. of water and 100 ml. of ethanol for a period of 10 hours. The ethanol is distilled off and the residue is dissolved in water and diethyl ether. The ether layer is separated, dried with sodium sulphate, filtered and concentrated by removal of the solvent. The residue (11 g.) appeared to be 10,11-dihydro-5-ethoxy-5H-dibenzo[a,d]cycloheptene. The alkaline water layer is acidified and extracted with diethyl ether. The ethereal solution is dried and filtered. Diethyl ether is distilled off and 59 grams of 10,11-dihydro-5H-dibenzo[a,d]cyclohepten-5-yl-malonic acid is obtained. Yield 79%. Melting point 186° (decomposition) after crystallization from ethyl acetate.

55 g. of 10,11-dihydro-5H-dibenzo[a,d]cyclohepten-5-yl-malonic acid is heated at a temperature of 170° until carbon dioxide is no longer evolved. The residue is crystallized from ethyl acetate. 35 g. of 10,11-dihydro-5H-dibenzo[a,d]cyclohepten-5-yl-acetic acid is obtained. Yield 75%. Melting point 157–161°.

Similarly, by substituting an equivalent of the following substituted 5H-dibenzo[a,d]cyclohepten-5-ones for the 10,11-dihydro-5H-dibenzo[a,d]cyclohepten-5-one in Procedure III, the indicated substituted-5H-dibenzo[a,d]cyclohepten-5-yl acetic acids are prepared:

| Substituted 5H-dibenzo[a,d]cyclohepten-5-one | Substituted 5H-dibenzo[a,d]cyclohepten-5-yl acetic acid |
| --- | --- |
| 1-methyl<br>2-ethyl<br>3-tert.-butyl<br>2,4-dimethyl<br>2-isopropyl-10,11-dihydro | 1-methyl<br>2-ethyl<br>3-tert.-butyl<br>2,4-dimethyl<br>2-isopropyl-10,11-dihydro |

PROCEDURE IV 22.9 g. of 10,11-dihydro-5H-dibenzo[a,d]cyclohepten-5-yl chloride and 16.1 g. of the copper derivative of ethyl acetoacetate are heated under reflux in benzene for a period of 6 hours with stirring. After cooling diethyl ether is added. A precipitate is filtered off. The filtrate is washed with water, with a dilute solution of sodium hydroxide and again with water. It is then dried with sodium sulphate. After filtration, the solvents are distilled off and the residue is crystallized from petroleum ether (boiling range 40–60°). Ethyl 10,11-dihydro-5H-dibenzo[a,d]cyclohepten-5-yl-acetoacetate, melting at 79–80°, is obtained in 93% yield.

A mixture of 9.7 g. of ethyl 10,11-dihydro-5H-dibenzo[a,d]cyclohepten-5-yl-acetoacetate in 150 ml. of ethanol and 150 g. of 50% sodium hydroxide are heated under reflux for a period of 3 hours. Ethanol is distilled off and after cooling diethyl ether and water are added. After separation the water layer is acidified and extracted with diethyl ether. The ethereal solution is dried with sodium sulphate and 10,11-dihydro-5H-dibenzo[a,d]cyclohepten-5-yl-acetic acid is obtained after filtration and evaporation of the diethyl ether solvent. Yield 54%.

PROCEDURE V 40 g. of 5H-dibenzo[a,d]cyclohepten-5-ol is dispersed in 150 ml. of glacial acetic acid. A solution of 22 g. of malonic acid in 150 ml. of glacial acetic acid is added. The mixture is heated at a temperature of 70° for two hours and left standing overnight at room temperature. Crystalline material is filtered off and dissolved in diethyl ether. To the filtrate water is added. A precipitate is filtered off and dissolved in a sodium hydroxide solution. A small amount of insoluble material is filtered off, the filtrate is acidified, the precipitate filtered off and dissolved in diethyl ether. The ethereal solutions are combined, and washed with water and dried with sodium sulphate. After filtration the solvent is distilled off. The residue, crude 5H-dibenzo[a,d]cyclohepten-5-yl-malonic acid is crystallized from a mixture of diethyl ether and petroleum ether (boiling range 40–60°). Yield 74%. Melting point 187° (decomposition).

A mixture of 40 g. of 5H-dibenzo[a,d]cyclohepten-5-yl-malonic acid and 110 ml. of pyridine are heated on a water bath for two hours. The warm mixture is poured onto a 15% (by weight) hydrogen chloride solution in water. The 5H-dibenzo[a,d]cyclohepten-5-yl-acetic acid formed is filtered off and dissolved in a mixture of diethyl ether and benzene. The aqueous layer is extracted three times with diethyl ether and the ethereal solutions are washed with water and dried with sodium sulphate. After filtration, ether is removed by evaporation. Yield 96% of the acid after crystallization from a mixture of diethyl ether and petroleum ether (boiling range 40–60°. Melting point of the acid is 160–162°.

The following examples, in which the temperatures mentioned are in degrees centigrade and the percentage yields mentioned are related to the theoretical yield, illustrate the preparation of dibenzazulenes of the present invention.

Example I (a) A mixture of 13.2 g. of 10,11-dihydro-5H-dibenzo-[a,d]cyclohepten-5-yl-acetic acid, 20 ml. of thionyl chloride and 50 ml. of anhydrous benzene is boiled under reflux for 2 hours. Benzene and excess thionyl chloride are distilled off, the residue is dissolved in 100 ml. of anhydrous carbon disulphide and the solution added drop-wise with stirring to 9 g. of aluminium chloride in 200 ml. of carbon disulphide at a temperature of −5°. The temperature is maintained at −5° for two hours. The mixture is stirred at room temperature for two hours and decomposed by addition of a dilute hydrochloric acid solution. The ketone formed is extracted with chloroform. The chloroform solution is dried with calcium chloride and, after filtration, concentrated by evaporation of the solvent. The residue is crystallized from a mixture of chloroform and petroleum ether (boiling range 28–40°). 6.9 g. of 2,6,7,11b-tetrahydro-1H-dibenzo-[c,d,h]azulen-2-one, melting at 213–215°, is obtained.

Analysis.—Calcd. for $C_{17}H_{14}O$: C, 87.14%; H, 6.03%. Found: C, 86.9%; H, 6.1%.

(b) A mixture of 4.72 g. of 2,6,7,11b-tetrahydro-1H-dibenzo[c,d,h]azulen-2-one and 6.2 g. of monomethylamine in 250 ml. of n-butanol is hydrogenated at a pressure of 50 atm. hydrogen at a temperature of 100° for a period of 5 hours. 2 g. of Raney nickel is used as catalyst. After cooling, the catalyst is filtered off, the butanol is distilled off and the residue dissolved in diethyl ether. To the solution obtained a solution of hydrogen chloride in diethyl ether is added. The hydrochloride of N-methyl-(2,6,7,11b-tetrahydro-1H-dibenzo[c,d,h]azulen-2-yl)amine is filtered off and purified by crystallization from a mixture of ethanol and diethyl ether. Yield 52%; melting point 278–280°.

Analysis.—Calcd. for $C_{18}H_{20}NCl$: C, 75.64%; H, 7.05%; N, 4.90%. Found: C, 75.7%; H, 7.0%; N, 4.7%.

Example II (a) A mixture of 20 g. of 10,11-dihydro-5H-dibenzo-[a,d]cyclohepten-5-yl-acetic acid, 30 ml. of thionyl chloride and 70 ml. of anhydrous benzene is boiled under reflux for two hours. Benzene and excess thionyl chloride is distilled off and the residue is dissolved in 160 ml. of nitrobenzene. To the solution a quantity of 40 ml. of stannic chloride is added and the mixture is kept at a temperature of 60° for three hours. Next, it is decomposed with water and subjected to a steam distillation. After complete removal of nitrobenzene, the mixture is treated with chloroform. A precipitate consisting of stannic hydroxide is filtered off. The chloroform layer is washed with a 2 N sodium hydroxide solution, then with water and dried with calcium chloride. After filtration the solvent is distilled off leaving a residue of crude 2,6,7,11b-tetrahydro-1H-dibenzo[c,d,h]azulen-2-one which melted at 212–214° after crystallization from a mixture of chloroform and petroleum ether (boiling range 28–40°). Yield 40%.

(b) A mixture of 7.6 g. of 2,6,7,11b-tetrahydro-1H-dibenzo[c,d,h]azulen-2-one and 13.5 g. of dimethylamine in 300 ml. of n-butanol is hydrogenated at a pressure of 50 atm. hydrogen at a temperature of 100° in the presence of 2 g. of Raney nickel catalyst for a period of 5 hours. The catalyst is filtered off, the butanol is distilled off and the residue dissolved in diethyl ether. A solution of maleic acid in diethyl ether is added. The maleate of N,N-dimethyl-(2,6,7,11b-tetrahydro-1H-dibenzo[c,d,h]azulen-2-yl)amine is filtered off and crystallized from methanol. Melting point 193–194°.

Analysis.—Calcd. for $C_{22}H_{23}NO_4$: C, 72.31%; H, 6.34%; N, 3.84%. Found: C, 72.5%; H, 6.4%; N, 3.7%.

In a similar manner but substituting an equivalent amount of appropriately substituted 5H-dibenzo[a,d]cyclohepten-5-yl acetic acids for the 10,11-dihydro-5H-dibenzo[a,d]cyclohepten-5-yl acetic acid, the following substituted 1H-dibenzo[c,d,h]azulenes and mixtures thereof are prepared.

| Substituted 5H-dibenzo[a, d] cyclohepten-5-yl-acetic acid | Substituted N,N-dimethyl(1H-dibenzo [c,d, h]azulen-2-yl)amine |
|---|---|
| 1-methyl | 5- and 8-methyl-2, 11b-dihydro |
| 2-ethyl | 4- and 9-ethyl-2, 11b-dihydro |
| 1-chloro-10, 11-dihydro | 5- and 8-chloro-2, 6, 7, 11b-tetrahydro |
| 2-bromo-10, 11-dihydro | 4- and 9-bromo-2, 6, 7, 11b-tetrahydro |
| 3-methyl-10, 11-dihydro | 3- and 10-methyl-2, 6, 7, 11b-tetrahydro |
| 4-methyl-10, 11-dihydro | 11-methyl-2, 6, 7, 11b-tetrahydro |
| 3-isopropyl-10, 11-dihydro | 3- and 10-isopropyl-2, 6, 7, 11b-tetrahydro |
| 1-ethyl-10, 11-dihydro | 5- and 8-ethyl-2, 6, 7, 11b-tetrahydro |
| 1, 3-dimethyl-10, 11-dihydro | 3,5- and 8, 10-dimethyl-2, 6, 7, 11b-tetrahydro |
| 3, 7-dimethyl-10, 11-dihydro | 3, 10-dimethyl-2, 6, 7, 11b-tetrahydro |
| 3-tert.-butyl | 3 and 10-tert.-butyl-2, 11b-dihydro |
| 2,4-dimethyl | 9-11-dimethyl-2, 11b-dihydro |

Example III

A mixture of 11.4 g. of 2,6,7,11b-tetrahydro-1H-dibenzo[c,d,h]azulen-2-one (prepared according to the procedure described in Example II under a) and 6.57 g. of phenyl isopropyl amine in 125 ml. of anhydrous xylene is boiled under reflux, while distilling off azeotropically the water thus formed. The rest of the solvent is distilled off. The residue is dissolved in 250 ml. of ethanol and to the solution is added portionwise 2.5 g. of sodium-borohydride at a temperature below 30°. The mixture is kept standing for about 30 minutes at room temperature and then boiled under reflux for about another 30 minutes. The ethanol is distilled off and water and diethylether are added to the residue. The ether layer is separated and washed with a diluted hydrochloric acid solution. The hydrochloride of N-phenyl-N-isopropyl-(2,6,7,11b-tetrahydro-1H-dibenzo[c,d,h]azulen-2-yl)amine precipitates and is filtered off and dried. After crystallization from methanol there is obtained 8.5 g. of the hydrochloride, melting at 281° (decomposition; in vacuo). Yield 40%.

Analysis.—Calcd. for $C_{26}H_{28}ClN$: C, 80.08%; H, 7.24%; N, 3.59%. Found: C, 80.0%; H, 7.1%; N, 3.4%.

The invention includes within its scope pharmaceutical preparations containing, as the active ingredient, at least one of the therapeutically active compounds of general Formula I, or a non-toxic acid addition salt thereof, in association with a pharmaceutically acceptable carrier. The preparations may take any of the forms customarily employed for administration of therapeutically active substances, but the preferred types are those suitable for oral administration and especially tablets, pills and capsules including the substance. The tablets and pills may be formulated in the usual manner with one or more pharmaceutically acceptable diluents or excipients, for example lactose or starch, and include materials of a lubricating nature, for example calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

What is claimed is:
1. A compound selected from the group consisting of dibenzazulenes of the formula

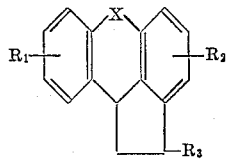

and non-toxic acid-addition salts thereof, wherein X is selected from the group consisting of —$CH_2$—$CH_2$— and —CH=CH—, $R_1$ and $R_2$ are each selected from the group consisting of hydrogen, halogen and lower alkyl, and $R_3$ is a basic nitrogen-containing radical of less than twelve carbon atoms.

2. N-methyl - (2,6,7,11b - tetrahydro - 1H-dibenzo[c,d,h]azulen-2-yl)amine.
3. A non-toxic acid-addition salt of the compound of claim 2.
4. The hydrochloride salt of the compound of claim 2.
5. N,N - dimethyl - (2,6,7,11b - tetrahydro-1H-dibenzo[c,d,h]azulen-2-yl)amine.
6. A non-toxic acid-addition salt of the compound of claim 5.
7. N - phenyl - N - isopropyl-(2,6,7,11b-tetrahydro-1H-dibenzo[c,d,h]azulen-2-yl)amine.
8. A non-toxic acid-addition salt of the compound of claim 7.

No references cited.

CHARLES B. PARKER, *Primary Examiner.*

N. A. WICZER, P. C. IVES, *Assistant Examiners.*